Feb. 9, 1932. E. R. EVANS 1,844,149
ELECTRICAL REGULATING APPARATUS
Filed June 29, 1929
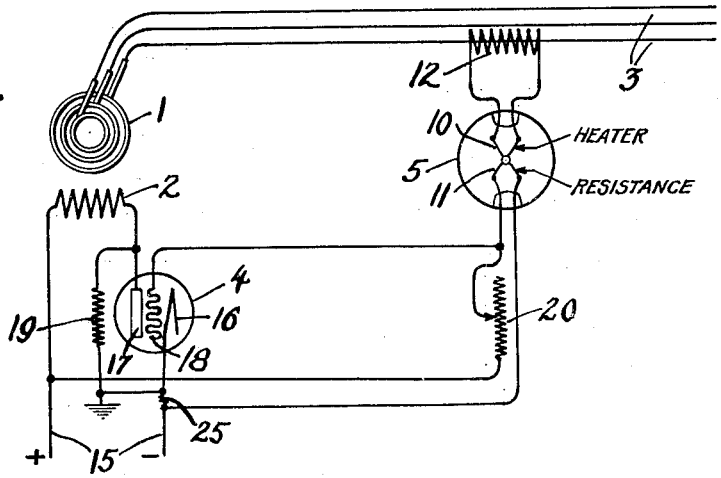
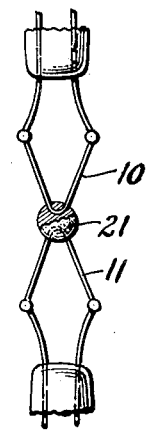 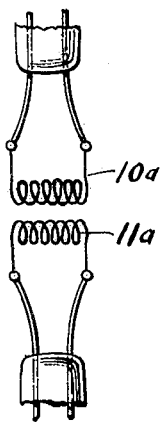
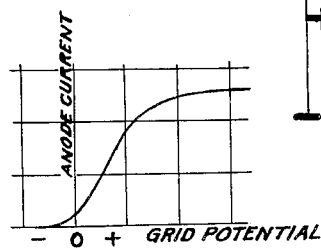
Inventor
Earl R. Evans Patented Feb. 9, 1932

1,844,149

UNITED STATES PATENT OFFICE

EARL RADFORD EVANS, OF WASHINGTON, DISTRICT OF COLUMBIA

ELECTRICAL REGULATING APPARATUS

Application filed June 29, 1929. Serial No. 374,934.

This invention relates to electrical regulating or controlling apparatus and particularly to a regulating apparatus embodying an electric discharge device and adapted for alternating current circuits.

An object of the invention is to provide a simplified voltage or current regulating system.

Another object of the invention is to provide a regulating system embodying a thermal element.

Another object of the invention is to provide a regulating system which requires no auxiliary devices to prevent hunting of the controlling elements.

For a better understanding of the invention reference should be had to the accompanying drawings, in which Fig. 1 is a diagrammatic view of an alternating current system embodying the invention.

Fig. 2 is a detail view of the heater control resistor shown in Fig. 1.

Fig. 3 is a similar view of a modified form of resistor, and

Fig. 4 is a graph of the characteristics of an electric discharge device which is adapted to be used in the system shown in Fig. 1.

Referring to Fig. 1 of the drawings, a three-phase alternator 1 is provided with a field winding 2 and supplies current to a distribution circuit 3. In order to control the excitation of the alternator 1, an electric discharge device 4 is connected in circuit with the field winding 2, the device 4 being controlled by a resistor 5 responsive to conditions in the circuit 3.

The control of the resistor 5 may be effected in various ways to respond to the voltage, current or other characteristic of the distribution circuit. In the present instance it may be assumed that the control is in accordance with the current flowing in the circuit so that the alternator 1 which is normally excited to maintain the no-load voltage, receives increased excitation through the field winding 2 as the load increases. The normal excitation of the machine which is effective at no load may be accomplished by the field winding 2 or in any other desired manner.

The resistor 5 comprises a heater element 10 and a resistor element 11 having a large temperature coefficient of resistance. The heater and the resistance elements are disposed in heat transfer relation whereby the resistance of the resistor depends upon the temperature of the heater. As indicated in the drawings, the heater and resistance elements may be filamentary wires of metal such as tungsten and enclosed in a glass or sealed envelope which may be evacuated or filled with an inert gas filling.

The heater element 10 is connected so as to be energized in accordance with the quantity, such as the current flowing in the circuit, to which the regulating apparatus is to respond. Thus the heater element 10 may be connected across the terminals of a secondary winding of the current transformer 12 whereby the current traversing the heater and therefore the temperature thereof depends upon the current flowing in the circuit 3. The temperature of the heater 10 varies the resistance of the resistor 11 which is so connected to the electric discharge device 4 as to effect the desired regulation of the alternator 1.

The electric discharge device 4 controlled in accordance with the device 5 is connected in series relation with the field winding 2 and the direct-current excitation circuit 15. While various forms of discharge devices may be employed, the device shown embodies a cathode 16 connected to the negative terminal of the circuit 15, an anode 17 and a control electrode or grid 18 connected to the device 5. The discharge device 4 may be shunted by a resistor 19 having an impedance of the same order as that of the discharge device when the potential of the control electrode is substantially zero or a larger impedance. Partial excitation of the field winding 2 is provided by the current traversing the resistance 19 irrespective of the impedance of the discharge device 4.

In the modification illustrated by way of example, the discharge device 4 is of the highly evacuated type operating with a pure electron discharge, the grid-potential, anode-current characteristic of such a device being shown in Fig. 4. Referring to this figure, it will be apparent that the anode current becomes zero at a slightly negative grid potential, and as the potential of the grid becomes more positive, the anode current increases substantially in proportion to the change in potential until the saturation point is reached. When the potential of the grid is referred to, it is the potential of the grid relative to the cathode that is meant.

The potential of the grid 18 relative to the cathode 16 is controlled in accordance with the resistance of the resistor 11. The resistor 11 is connected across the circuit 15 which is of constant potential or a rectified alternating voltage of constant average potential. A variable control resistor 20 may be connected in series relation with the resistor 11 to provide an additional adjustment and to minimize the heating effect of the current flowing in this circuit. The resistance of the resistor 20 is preferably larger than that of the resistor 11, and is preferably of a material having a small temperature coefficient of resistance.

A resistor 25 may be connected in series with the discharge device 4, the shunt circuit including the resistor 11 being connected to the supply side of the resistor 25 so that the drop of potential across the resistor 25 maintains the potential of the grid 18 negative with respect to the cathode 16 when the heater 10 is inoperative because of the open-circuit condition of the circuit 3. As the current increases in the circuit 3, the temperature of the heater 10 rises, thereby increasing the resistance of the resistor 11. Since the total potential drop across the resistors 11 and 20 is substantially constant, the change of resistance of the resistor 11 causes the potential of the grid 18 to become more positive, thereby decreasing the effective impedance of and increasing the current through the discharge device 4 and thus varying the excitation of the field winding 2.

The variation of excitation may correspond to the changes in current in the circuit 3 or may be adjusted to obtain either a flat, rising or drooping characteristic of the terminal voltage of the machine 1 by suitable adjustment of the resistors 11, 19, 20 and 25. The thermal capacity of the elements 10 and 11 may be proportioned to obtain the desired rapidity of operation of the regulating apparatus. Under certain conditions, rapid response to changes in current are desired and this can be readily obtained by reducing the mass of the heated elements 10 and 11. In general, however, the rapidity of response of the device 5 should not be greater than the rapidity of response of the terminal voltage of the machine 1 to changes in excitation in order to avoid hunting. With this proportioning of parts, complicated anti-hunting devices in connection with the regulating apparatus are unnecessary.

The heater element 10 and resistor 11 may be of refractory metal adapted to operate at red heat or even at incandescence for long periods. These elements may further be sealed in a glass envelope, either evacuated or filled with an inert gas. The elements 10 and 11 may be in conductive heat-transfer relation by reason of a heat-conducting body 21 extending therebetween, as shown in Fig. 2, or may be in radiating heat-transfer relation, as shown in Fig. 3. In Fig. 3, the heater element and resistor are designated 10a and 11a, respectively. Various other modifications of the invention will occur to those skilled in the art and I desire that the scope of the invention be limited only as set forth in the appended claims.

I claim:

1. An electrical system comprising a generator, an excitation circuit therefor, means including an electrical discharge device of controllable impedance for regulating said generator and thermal means including a resistor having an appreciable temperature coefficient of resistance connected across said excitation circuit for varying the impedance of said discharge device upon the occurrence of variations in the generator load current.

2. An electrical system comprising a generator provided with a field winding, a source of current connected to said field winding, and means including a space discharge device for regulating the excitation of said field winding, said discharge device including an impedance controlling element and said means including a resistor having an appreciable temperature coefficient of resistance bridged across said source and in circuit with said element to control the potential thereof.

3. An electrical system comprising a generator provided with a field winding, means including a space discharge device provided with a control grid for regulating the excitation of said field winding, a substantially constant potential source, a resistor having an appreciable temperature coefficient of resistance connected to said source and said control grid to vary the potential of the latter in accordance with variations in the temperature thereof and connections for said resistor to effect desired changes in the temperature thereof.

4. An electrical system comprising a generator provided with a field winding, a source connected to the field winding for exciting the generator, a space discharge device connected in series with said source and field winding, said device being provided with an impedance-varying element, a resistor having an appreciable temperature coefficient of resistance bridged across said exciting circuit and connected to said impedance-varying element and means for effecting desired changes in the temperature of said resistor to thereby regulate the excitation of the generator.

5. In combination, a generator having an output circuit, means for regulating said generator comprising a resistor and a heater in heat-transfer relation, said regulating means further comprising a space discharge device having its input circuit connected to said resistor and its output circuit connected to said generator and means including a current transformer for energizing said heater from the output circuit and electrically insulating the same therefrom.

6. Regulating means for a generator provided with a field winding and a space discharge device controlling the current in said winding, characterized by means for controlling the impedance of said space discharge device including a resistor in shunt relation to said field winding and connected to said device, and means for varying the resistance of said resistor in accordance with the condition for which regulation is desired.

7. Regulating means for a generator provided with a field winding and a space discharge device controlling the current in said winding, said space discharge device comprising an anode, cathode and control electrode, characterized by means for controlling the potential of said control electrode including a resistor connected across the field circuit and to said control electrode, and means for varying the resistance of said resistor.

EARL R. EVANS.